INVENTORS
MARTIN A. MITTLER
SEYMOUR OFFERMAN
ROBERT B. PITTMAN
RICHARD A. ROSENBERG

BY James and Franklin
ATTORNEYS

Sept. 21, 1965 M. A. MITTLER ETAL 3,208,028
MULTILAYER CIRCUITRY WITH INTERRUPTED LINES
Filed April 30, 1963 5 Sheets-Sheet 2

INVENTORS
MARTIN A. MITTLER
SEYMOUR OFFERMAN
ROBERT B. PITTMAN
RICHARD A. ROSENBERG
BY
James and Franklin
ATTORNEYS

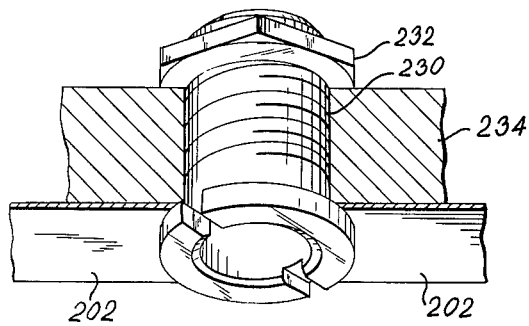
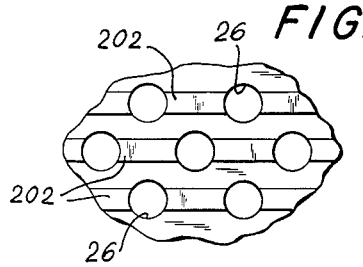
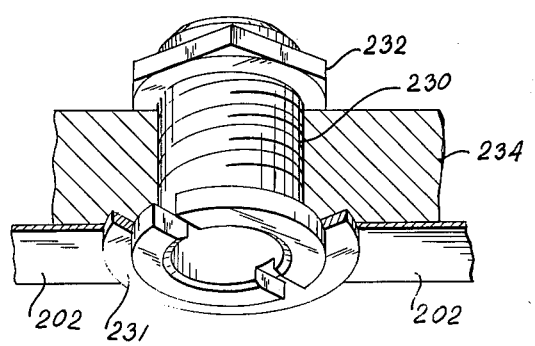
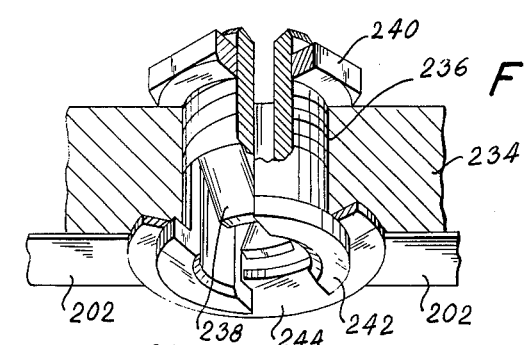
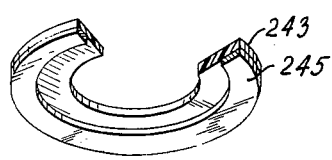
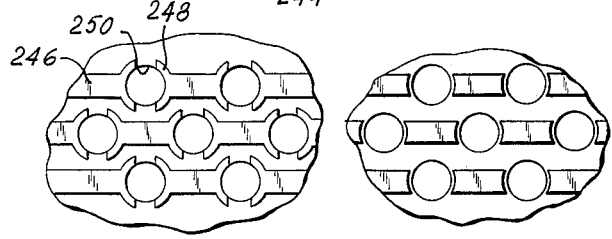

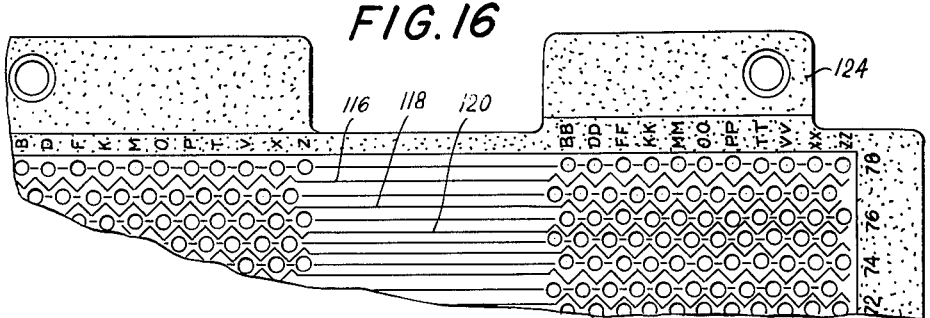
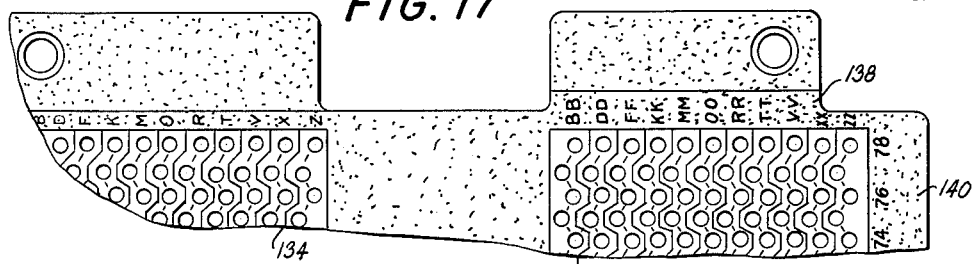
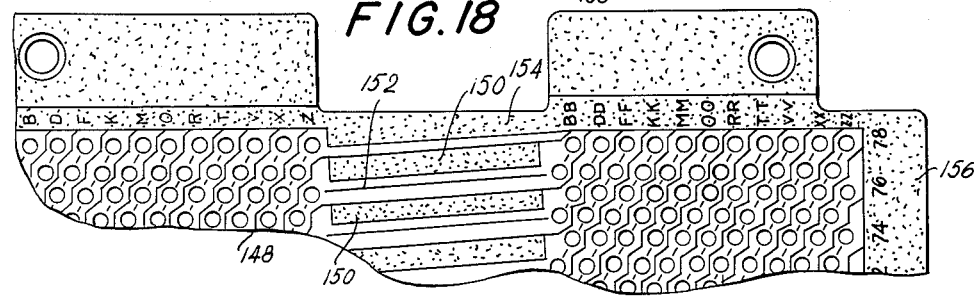
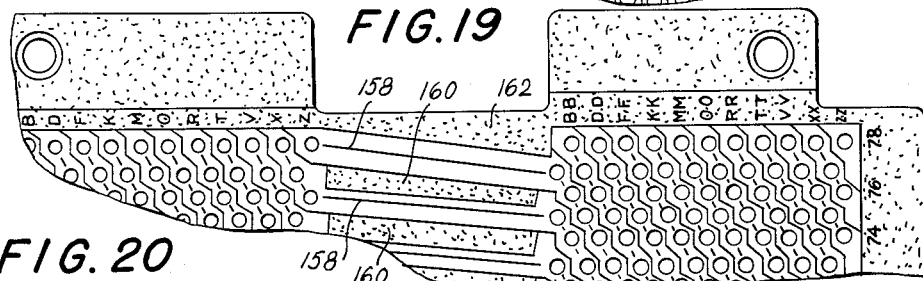
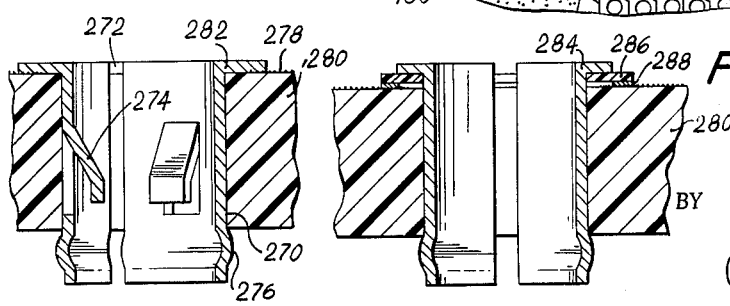

United States Patent Office 3,208,028
Patented Sept. 21, 1965

3,208,028
MULTILAYER CIRCUITRY WITH
INTERRUPTED LINES
Martin A. Mittler, Flushing, and Seymour Offerman, New York, N.Y., and Robert B. Pittman, River Edge, and Richard A. Rosenberg, Dumont, N.J., assignors to Industrial Electronic Hardware Corp., New York, N.Y., a corporation of New York
Filed Apr. 30, 1963, Ser. No. 276,830
25 Claims. (Cl. 339—18)

This invention relates to complex back panel wiring, and more particularly to multiple layer printed circuitry for accomplishing such wiring, especially but not necessarily for computer racks.

Computers have racks which slidably receive interchangeable printed circuit boards, sometimes called "mother boards." These are detachably received in edgeboard connectors at the back, and the contacts of the connectors have lugs for numerous wire connections located behind the rack. It is painstaking and expensive to do this wiring.

In our copending applications, Serial Number 168,791, filed January 25, 1962, now Patent number 3,179,913, issued April 20, 1965, and entitled, "Multilayer Circuitry," and Serial Number 276,796, filed concurrently herewith, and entitled, "Multilayer Circuitry With Placed Bushing," we disclose the use of multiple printed circuit boards which are coextensive with the connectors at the back of the rack, and which receive pins pushed through aligned holes in the boards to connect the circuit lines of different boards to each other and/or to an edgeboard connector.

In the multilayer circuitry disclosed in said prior applications, there is some difficulty in interrupting or open-circuiting the lines on a matrix board. The usual procedure is to actually cut or scrape away part of a line. Also, we there provided extra matrix boards which have interrupted lines or dashes, in which case a connection may be carried up to such a board by means of a pin, and then back by means of another pin, but the pins must be adjacent pins. There is no way to connect dashes end-to-end on the same board.

One object of the present invention is to simplify the provision of interrupted lines. Another object is to provide for bridging the gaps in interrupted lines. A further object is to reduce the number of matrix boards needed. In accordance with the present invention, the matrix boards have only interrupted lines, that is, short dashes between holes. A metal washer (or the flange of a flanged bushing) is applied to the hole when it is desired to connect the dashes at each side of the hole. By making the bushing a tongued metal bushing, a further connection is made to the pin passing therethrough. By using a bushing made of insulating material, or metal but without tongues, no connection is made to the pin, but the dashes at the bushing are connected by the metal washer. When an interruption or open circuit is required, the hole is simply left empty, or alternatively, we may employ an insulation bushing with no metal washer.

A further object of the present invention is to provide suitable bushing and washer combinations. In one form the bushing is externally threaded and receives a nut. In such case the hole in the board preferably is threaded, so that the nut acts as a lock nut. In another form the bushing is made somewhat resilient and radially compressible so that it may be inserted in the hole and washer with a snap fit. In either case the mechanical connection provided may be supplemented by soldering, as is common in printed circuitry.

To accomplish the foregoing general objects, and other more specific objects which will hereinafter appear, our invention resides in the multilayer circuitry elements and their relation one to another, as are hereinafter more particularly described in the following specification. The specification is accompanied by drawings in which:

FIG. 9 is a fragmentary partially-sectioned perspective view showing an insulation bushing of the screw type;

FIG. 10 is a similar view showing a similar bushing used with a metal washer;

FIG. 11 is a similar view showing a metal bushing used with a metal washer;

FIG. 12 is a similar view showing a special washer for use with a tongueless metal bushing;

FIG. 13 is a fragmentary view showing interrupted printed circuit lines or dashes;

FIGS. 14A and 14B are views showing modifications;

Figure 2:
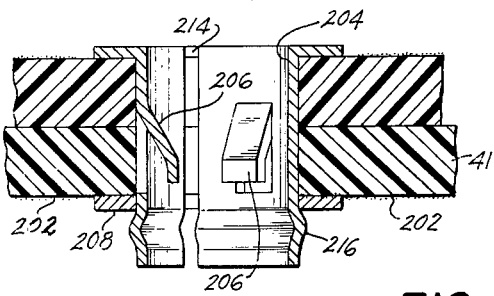
FIG. 2 is a fragmentary section drawn to enlarged scale through a metal bushing and washer.
Figure 15:
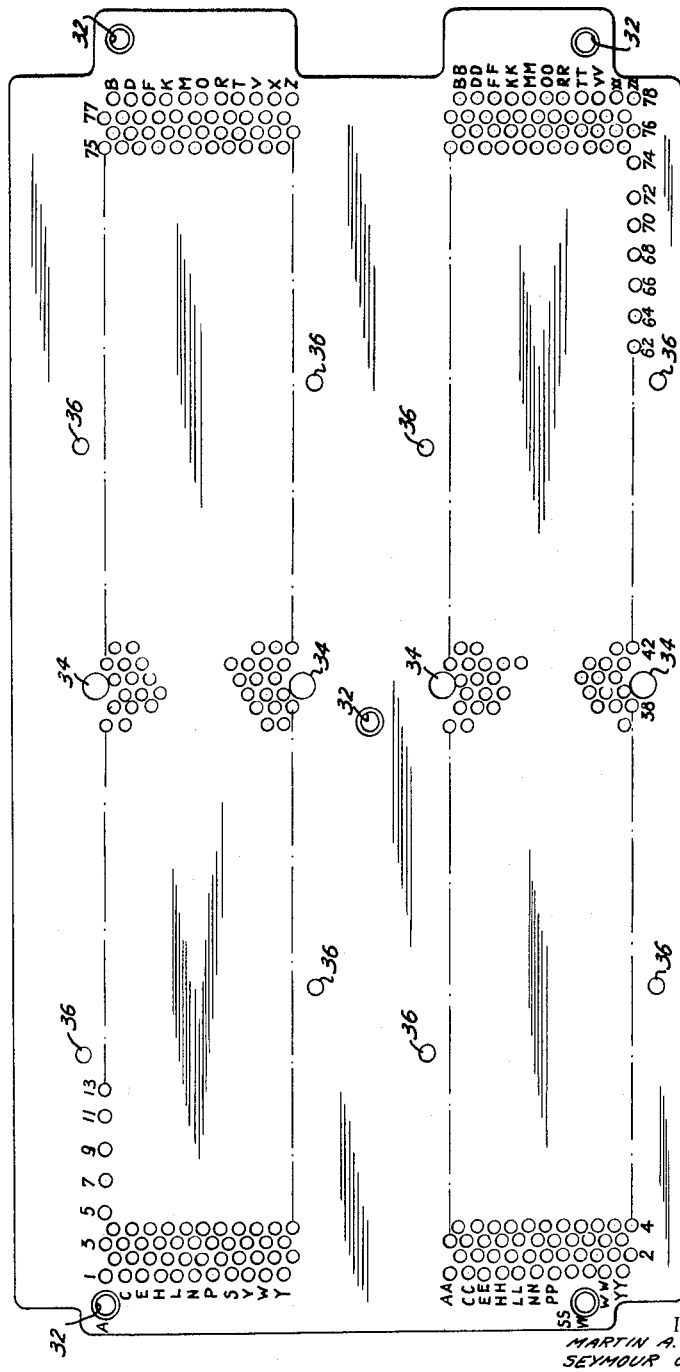
FIG. 15 illustrates a typical circuit board, without the printed lines.

FIG. 16 corresponds to the right end of FIG. 15 and shows a board printed with vertical dashes;

FIG. 17 is a similar view but showing a board printed with horizontal dashes;

FIG. 18 is a similar view but showing a board printed with diagonal dashes;

FIG. 19 is a similar view but showing a board printed with diagonal dashes of opposite slope;

FIG. 20 is a fragmentary section showing a modified form of the spring bushing shown in FIG. 2; and FIG. 21 is a similar view showing a modified form of tongueless bushing.

Figure 1:
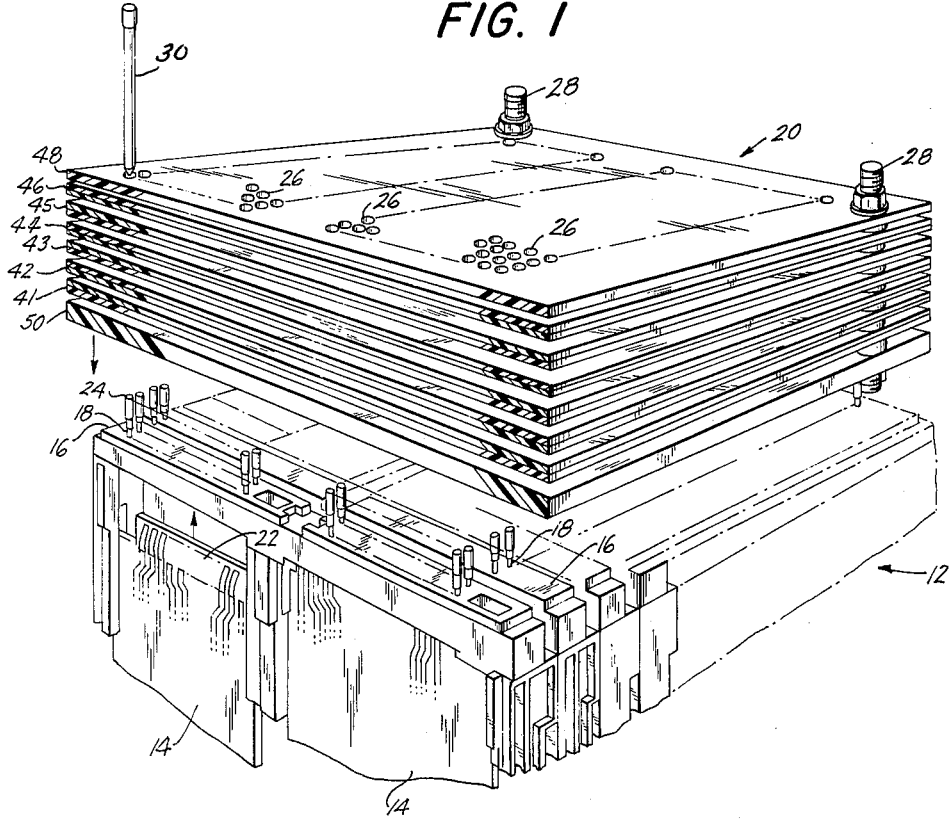
FIG. 1 is a perspective view showing multilayer circuitry separated from the back of a rack with which it is to be used.

Referring to the drawing, and more particularly to FIG. 1, the computer rack generally designated 12 has guide grooves for the slidable reception of printed circuit boards 14 called "mother boards." The upper edges of the boards are received in edgeboard connectors located at 16. These connectors have a terminal for each contact, resulting in an array of many hundreds of terminals, a few of which are indicated at 18. They must be interconnected by complex back panel wiring.

In accordance with our prior and present inventions, this back panel wiring is replaced by a multilayer matrix indicated generally at 20, the matrix boards being coextensive in area with the array of edgeboard connectors 16, and being disposed perpendicular to the mother boards 14.

In FIG. 1, the matrix boards are shown disposed over but separated from the back of the rack, the latter having been turned face down so that the mother boards 14 are upright, with their then upper edges received in the edge board connectors 16. One mother board has been slid down somewhat to show its edge 22. The connectors 16 may be conventional, except that female rather than male terminals are wanted, and in this case male terminals have been converted to female terminals at 24. Only a few of the terminals are shown, but it will be understood that the connectors are filled with terminals.

The matrix boards 20 have a large number of holes, a few of which are indicated at 26, and in the present case about half of these are located in alignment with the terminals 24. All of the holes in each board are in alignment with the corresponding holes in all of the mother boards, and the boards are held in registration, as by means of spacers and bolts, two of which are indicated at 28. There are also grounding bolts, not shown, which pass through the matrix boards and into the rear frame of the rack, and these act as ground connections for matrix shielding which is described later. The grounding bolts and spacer bolts are described in full detail in our said application Serial Number 168,791.

The circuitry is completed by pins, one of which is indicated at 30, and which are dimensioned to pass through the aligned holes, and which in many but not all cases are received in the female terminals 24 to provide electrical connection between the terminals and printed lines on the matrix boards. Additional rows of holes located between the rows of terminals 24 make possible additional connections between matrix boards. In the present case each edgeboard connector has two rows of terminals, and the boards have two additional rows of holes between the collateral connectors.

FIG. 15 shows a typical insulation board with perforations therethrough, it being understood that perforations are completed all the way across the board between those shown. The completion of the holes in the matrix board is indicated by the broken lines, the area between the upper two broken lines being filled with holes, and similar remark applies to the area between the lower two broken lines. The holes are somewhat staggered or offset, to match the terminals of the edgeboard connectors. This pattern of holes is the same for all of the boards, although the printed circuit lines on the boards differ.

It will be noted that for identification or coding, the holes are lettered from A through Z in vertical direction, with alternate letters on one end, and the intermediate letters at the other end of the board. The lower array is distinguished from the upper by the use of double letters AA, BB, etc., instead of A, B, etc. In horizontal direction the holes are numbered 1–78, with alternate or odd numbers at the top, and the intermediate or even numbers at the bottom.

While referring to FIG. 15, it may be pointed out that the four end holes and one center hole marked 32 receive the spacer bolts 28 referred to in FIG. 1. The four middle holes marked 34 are clearance holes for four main bus wire connections. The eight holes marked 36 receive grounding bolts.

Reverting to FIG. 1, in the present case there are six matrix boards marked 41 through 46. There is also a thicker base plate 50, and a thin insulation cover board 48, which have no printed circuitry. The matrix boards 41 through 46 are printed with interrupted lines, and in the particular case here shown the board 41 has vertical lines; the board 42 has horizontal or transverse lines; the board 43 has diagonal lines; and the board 44 has diagonal lines of opposite slope. Additional boards make possible additional connections. The board 45 again has interrupted vertical lines; and the board 46 again has interrupted transverse lines. The opposite face of each matrix board, in this case the upper face, is coated with a metallic shield surface or coating, and the grid side of the board has another grid of grounded shield lines alternating between the circuit lines, as is described later. In most cases the grid of shield lines is sufficient, without the back or surface shielding.

Figure 5:
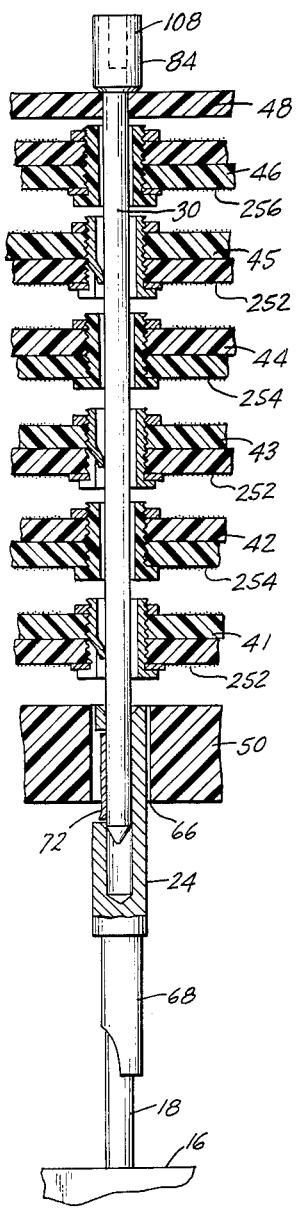
FIG. 5 is a section through a stack of boards showing the use of metal and insulation bushings.

The relationship of a connector pin to the contact boards is illustrated in FIG. 5, referring to which the pin 30 is pushed through the boards 48, 46, 45, 44, etc., and then into a female terminal 24 of an edgeboard connector 16. The upper end portion of terminal 24 is received in a mating hole 66 of the base plate 50, and it will be understood that there are similar holes properly located for all such terminals. In the particular structure here illustrated, the edgeboard connectors 16 had male terminals 18, and the parts 24 were added to convert them to female terminals. The shank 68 of female part 24 is soldered to the male terminal 18. The part 24 has a contact spring 72.

Referring to FIG. 13, the printed lines 202 are short dashes between the holes 26. The lines are interrupted by the holes, and require connecting or bridging members at the holes to establish complete circuit lines.

Figure 4:
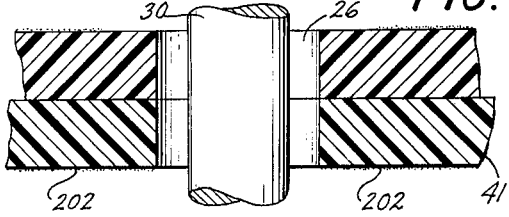
FIG. 4 is a similar view showing the relation of the hole in a board to a pin passing therethrough when no bushing is employed.

Referring now to FIG. 4, the printed circuit board 41 has a hole 26 through which a metal pin 30 passes. The hole diameter is substantially larger than the pin diameter, and in the absence of an appropriate bushing and/or washer, described later, the short lines or dashes 202 are not connected to each other, nor to the pin 30.

Referring now to FIG. 2, in this case the board 41 and more specifically the hole therein has received a metal bushing 204. This bushing has three tongues 206 which project inwardly for good contact with a pin forced through the bushing. The bushing holds a metal washer 208 in position, and the washer overlaps and connects the short printed lines 202 to each other and also to the bushing 204. Thus, a continuous line is established, and the line is connected to the pin.

Figure 3:
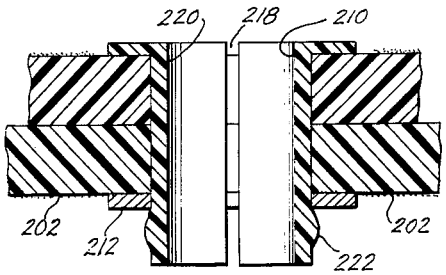
FIG. 3 is a similar view through an insulation bushing and metal washer.

Referring now to FIG. 3, the bushing 210 is made of an insulating material. It holds a metal washer 212 in position, the said washer overlapping and connecting the short lines 202. It will be seen that in this case a continuous line is established, but there is no connection to the pin.

The bushing shown in FIG. 2 is a spring bushing which is received in the board with a snap fit. More specifically, it is a form of rolled metal eyelet which has a longitudinal gap or opening indicated at 214. The gap is preferably midway between two tongues. A bead is rolled outward at 216. The resilience of the parts is such that the bushing may be pushed through the hole in the board and through the metal washer 208, and is then held in position by the spring locking action. This locking action need not be great, and usually is relied on merely to hold the parts temporarily in assembled relation pending a soldering operation, which may be performed either by dip soldering or by placing soldering rings over the end of the bushings (in inverted position compared to FIG. 2), and then heating the board in a suitable oven or beneath heat lamps.

The plastic bushing shown in FIG. 3 similarly may be designed to be received with a snap fit, it being open on one side, as indicated by the gap 218. In this case the side wall 220 may be thicker than when using metal, and no inwardly directed tongues are wanted. The washer 212 may be the same as that employed in FIG. 2, and similarly the electrical connection between the lines and the washer may be improved and made permanent by the use of solder.

The flange of bushing 204 does not contact the shielding at the top because the latter terminates short of the flange. However, when the lines 202 on the broken surface are deposited they come to the hole. The tongues 206 are shorter than the thickness of the matrix board, and are not subjected to solder. The tongued metal bushing is made of beryllium copper. After complete fabrication of the piece it may be heat treated to give the tongues the desired resilience.

Other structural forms of bushing may be employed, and FIGS. 9, 10 and 11 illustrate the use of screw bushings. In FIG. 9 the threaded bushing 230 is made of an insulating material. It receives a nut 232 which may be made of metal or of insulation. The hole in the board 234 preferably is threaded, in which case the bushing is screwed into the hole, and the nut 232 acts as a lock nut, Referring now to FIG. 10, the arrangement is generally the same as that shown in FIG. 9, except that the insulation bushing 230 holds a metal washer 231 in position. The nut 232 may be either metal or insulation. Here again the hole in board 234 preferably is threaded, in which case the nut 232 acts as a lock nut.

Referring now to FIG. 11, the bushing 236 is made of metal, and has tongues 238 bent inward therefrom. The upper end of the bushing receives a nut 240, and its lower end or head 242 receives and holds a metal washer 244. This overlaps the printed metal dashes 202 at each side of the bushing. The hole is preferably threaded so that the nut acts as a lock nut. An electrical connection is provided between the dashes 202 and the pin passing through the bushing.

It is possible to use metal instead of insulation material for a bushing which is not to contact the pin. For this purpose a metal bushing may be used which is like that shown in FIG. 11, except that the inwardly bent tongues 238 are omitted. The inside diameter of the bushing without the tongues is substantially greater than that of the pin.

If desired, a special washer may be employed, such as that illustrated in FIG. 12, in which the washer has a metal part 245 and an insulation part 243. The washer has been inverted in FIG. 12 to better show the metal part 245, the inside diameter of which is larger than that of the insulation part 243. With such a washer the short lines between holes are terminated somewhat short of the hole, in which case there will be no connection between the lines and the metal bushing, thus additionally guarding against any possibility of contact with a pin, because the bushing itself is not in contact with the lines. Another way to accomplish the shortening of the lines is to slightly chamfer the holes.

The use of tongueless metal bushings instead of insulation bushings is not limited to the screw bushings shown in FIGS. 9–11. Reverting to FIG. 2, the metal bushing there shown may be used by omitting the tongues. The special washer shown in FIG. 12 may be employed, if it be desired to additionally guard against connection to the pin by avoiding connection to the bushing.

It will be understood that with the metal bushing and washer of FIG. 11 (and FIG. 2) the printed line 202 is made continuous and is connected to a pin passing through the bushing. In the arrangement of FIG. 10 (and FIG. 3) the printed line 202 is made continuous by the washer, but there is no connection to the pin, it being insulated by the bushing. In the arrangement of FIG. 9 there is no connection between the printed lines nor to the pin. In this case it is also feasible to simply omit the bushing, as shown in FIG. 4, the two structures being alternatively usable.

In FIG. 13 the lines 202 are plain straight lines of uniform width, which are considered adequate. However, if desired, the printed line may be enlarged at its end adjacent the hole. Such an arrangement is shown in FIG. 14A, in which each short line or dash 246 is enlarged at its ends with an arcuate enlargement 248. The gap between the arcs 248 is kept ample for the intended open circuit between the successive dashes.

In either case the printed line may be kept a little short of the hole, as mentioned above for use with tongueless metal bushings, and such printed lines are shown in FIG. 14B.

It will be understood that the parts shown in FIGS. 10, 11 and 12 may be and preferably are supplemented with solder, as previously described in connection with FIGS. 2 and 3. In FIG. 11 the solder serves to connect the lines to the washer and the bushing, and in FIGS. 10 and 12 it serves to connect the lines to the washer.

Figure 7:
FIG. 7 illustrates one of the pins.

One of the pins is illustrated in FIG. 7, it comprising a metal shank of uniform diameter, and a head 84 which may be given any desired configuration, but which most simply is left cylindrical. It is preferably counterbored as shown at 108 to make possible additional wire connections, should such be needed. The lower end of the pin is somewhat pointed to facilitate inserting the same through the stack of boards.

Referring now to FIG. 5 of the drawing, the pin 30 is here used with a stack of six boards, marked 41 through 46. In this case it is assumed that threaded bushings are used, and that every hole is given a bushing. In the particular case shown, boards 41, 43 and 45 have metal bushings and washers, and are there connected to one another as well as to the lines 252.

The boards 42 and 44 have insulation bushings with no washers, and therefore the lines 254 are open circuited and are not connected to the pin 30. The board 46 has an insulation bushing with a metal washer, and therefore the lines 256 are connected end-to-end, but are not connected to the pin 30.

Figure 6:
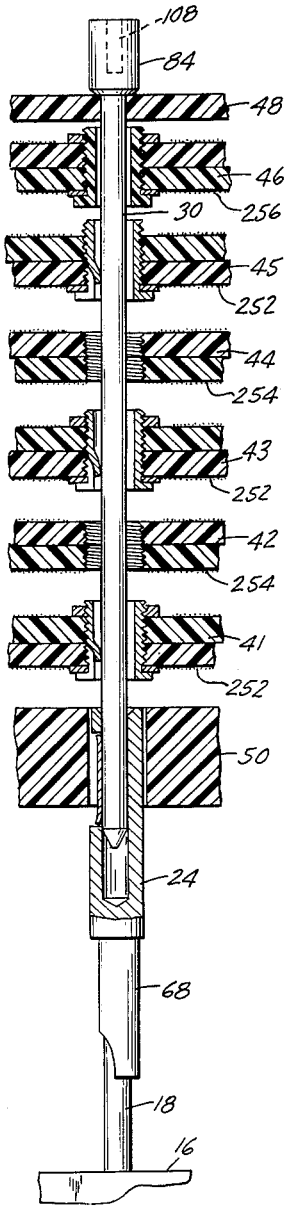
FIG. 6 is a similar view, showing a modification in which some bushings are omitted.

FIG. 6 shows an arrangement similar to that shown in FIG. 5, except that the bushings have been entirely omitted in boards 42 and 44. The electrical result in FIG. 6 is the same as in FIG. 5; that is, the lines 252 of boards 41, 43 and 45 are connected end-to-end and to the pin 30. The lines 254 of boards 42 and 44 are not connected to each other nor to the pin 30. The lines 256 are connected end-to-end by the metal washer 244, but they are not connected to the pin 30.

Figure 8:
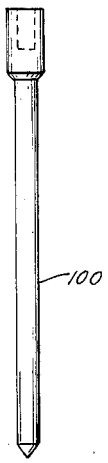
FIG. 8 shows a shortened pin which avoids connection to a subjacent terminal.

It will be understood that not every hole requires a pin. Pins are used when a connection is needed from a terminal 24 to one or more boards. In many cases a connection is needed from one board to one or more other boards, but not to a terminal 24. In such case a shorter pin is employed, as illustrated in FIG. 8, in which the pin 100 is long enough to pass through the boards but not to reach the terminal 24.

Referring to FIG. 16, the part there shown corresponds to the right end of FIG. 15 and illustrates the provision of vertical dashes. It may be explained that the lines are called vertical by those working in this art because that would be their position when looking at the complete board as in FIG. 15 in which the long dimension of the board is considered to be horizontal.

In FIG. 16 the holes numbered 78, as printed permanently on the board, are connected by vertical printed dashes shown running from hole to hole across the drawing. The holes numbered 77 as printed on the board (the number 77 does not show in FIG. 16, it being on the cutaway top portion of the board, but it does show in FIG. 15) are similarly connected by vertical dashes. The holes numbered 76 also are connected by vertical dashes, and so on.

These circuit lines are shielded by intermediate printed lines indicated at 116, 118, 120, etc. These shield lines are given a somewhat zig-zag formation because the holes themselves are in staggered relation. The vertical shield lines may be made straight when there is greater spacing between holes. The shield lines 116, 118, etc., are all grounded, and for this purpose they are connected at their ends to horizontal metal areas 122, which in turn are connected by vertical areas 124. The areas 122 and 124 form a rectangular peripheral frame area extending outward to the edge of the board, and at suitable points this frame includes the holes for the grounding bolts previously mentioned. The shield lines 116, 118, 120, etc., form a shield grid within the peripheral frame area.

FIG. 17 is a similar view but shows a matrix board having horizontal dashes. In this case, the lines are somewhat zig-zag because of the staggered relation of the holes. The holes marked Z on the board are connected by a horizontal dash line; the holes marked X on the board are connected by a horizontal dash line; the holes marked BB, by a horizontal dash line; the holes marked DD, by a horizontal dash line, and so on.

The horizontal dash lines are shielded by printed shield lines located between the dash lines. Thus, there is a shield line 134 between the horizontal dashes X and Z, and a shield line 136 between the horizontal dashes BB and DD. The shield lines terminate at their ends in vertical ground areas 138. These in turn are connected to horizontal ground areas 140. As previously mentioned in connection with FIG. 16, the ground areas may extend out to the edge of the board, and the horizontal ground areas lead to grounding bolts.

Referring now to FIG. 18, there are printed diagonal dashes. One diagonal dash line begins at the hole marked Z on the board. Another diagonal dash line begins at the hole marked X on the board.

As before, there are shield lines between the dash lines, one of these being indicated at 148, between the diagonal dash lines X and Z. Shield lines in each half of the board may be connected to one another as indicated by the lines 150, and these may be widened into areas as shown. The dash lines also may connected, as indicated at 152.

There are peripheral grounding areas, indicated here at 154 and 156. These extend in a closed circuit around the board, and are connected to the grounding bolts.

FIG. 19 shows a matrix board like that shown in FIG. 18, except that the diagonal dashes slope in opposite direction. The holes are connected by printed dashes, and the dashes of the upper and lower banks may be connected as indicated at 158. Shielding lines are disposed between the dash lines, and are connected to one another as indicated at 160. They are also connected to peripheral grounding areas 162 which extend around the board and which receive the shield lines to form a shield grid. The shielding areas are connected to grounding bolts as previously described.

The overall problem is to provide a great variety of possible connections, which in many cases may require a jump over a transverse line on another matrix board, and the dashes greatly facilitate these bridging or jump connections, as well as shortened lines along a board.

Overall surface shielding may be provided on the opposite face of each of the matrix boards. It is found convenient to apply metal to only one face of a circuit board, and therefore in the structure of FIGS. 1–6 each matrix board is laminated, it comprising two thin layers of insulation. The bottom face of the lower board is printed with matrix lines as shown in FIGS. 16–19. The top face of the upper board is printed with the surface shielding. The metal coating is essentially an overall coating, but a small annular area around each hole is not coated, the purpose being to avoid grounding the flanges of the bushings.

The printed dashes have been shown on the bottom of the board, but they may be on the top, and the printed board may be of single thickness. Such an arrangement is shown in FIG. 20 in which the metal bushing 270 is of the spring type, it being slotted or open at 272. It has inwardly struck tongues 274, and an annular bead 276. The printed dashes 278 are on top of the board 280. The flange 282 of the bushing serves to connect the lines 278 to each other, and through tongues 274 to a pin (not shown) passing through the bushing.

An insulation bushing may be employed, like that shown in FIG. 3 but with the metal washer at the top, when it is desired to make contact between the dashes 278, but not to the pin. Alternatively, if it be desired to use metal rather than plastics for the bushing, the tongues 274 may be omitted and the flange 282 then serves to connect the dashes. If desired, the special washer shown in FIG. 12 may be used, as illustrated in FIG. 21, in which the tongueless metal bushing 284 bears against an insulation washer 286 having a metal ring 288. The latter connects the printed dashes (which terminate a little short of the hole), and the insulation washer 286 prevents contact with the bushing 284, thereby additionally guarding against electrical connection to a pin passing through the metal bushing.

The use of an insulation bushing and metal washer has not been illustrated, but would be essentially the same as is illustrated in FIG. 3, except that the metal washer is located at the top instead of at the bottom.

It is believed that the construction, method of assembly, and method of use of our improved multilayer circuitry will be apparent from the foregoing detailed description. Once the plan for the wiring has been set up, the bushings are inserted each in its appropriate hole, with the help of the alpha-numeric code printed on the board. The worker uses either a tongued or tongueless bushing, with or without washers, as called for by the wiring plan. Solder rings may be applied, and the boards heated to form soldered connections. After the boards have been completed and assembled the pins are inserted in appropriate holes with the help of the alpha-numeric code. Either a full length pin or a shortened pin is employed, as specified by the wiring plan.

The multilayer circuitry has been shown applied to a computer rack, but it is useful for other purposes and particularly where there is a large array of numerous closely spaced terminals to be interconnected. It will also be understood that while we have shown the use of six matrix boards, a greater or lesser number of boards may be employed, depending upon the complexity of the circuitry to be produced. The same boards may be used in multiple; that is, two sets of four may be superposed, making eight in all, or, three sets of four may be superposed, making twelve in all, thus greatly increasing the number of combinations of connections obtainable. In such case the pins are appropriately lengthened. Extra boards may be provided which are not in full sets, this being shown in FIG. 1 in which there are only two extra boards.

It will be apparent that while we have shown and described the invention in a preferred form, changes may be made without departing from the scope of the invention, as sought to be defined in the following claims. In the claims the mention of superposed matrix boards refers to the position shown in FIG. 1 when the circuitry is being completed by the insertion of pins, even though in practice the entire assembly later may be and usually is used in upright position. The term "mother board" is used primarily to distinguish it from the term "matrix" board. The former refers to printed circuit boards or so-called "cards" detachably received in the edgeboard connectors. The latter applies to specially printed multilayer boards as well as those filled with horizontal, vertical, and diagonal dashes, and is to be distinguished from the removable boards or cards.

We claim:

1. Multilayer circuitry comprising a plurality of superposed matrix boards, each board having printed wiring, means holding said boards in superposed relation, said boards having aligned holes, the printed lines being short dashes between the holes, a metal contact bushing secured in some holes for connection to pins and also serving to connect the printed circuit lines on each side of the bushing, metal washers around some holes which connect the printed circuit lines on each side of the hole, the remaining holes having no means to connect the printed circuit lines thereat, and metal pins in some of said aligned holes for connection to those boards where there are metal bushings.

2. Multilayer circuitry comprising a plurality of superposed matrix boards, each board having printed wiring, means holding said boards in superposed relation, said boards having aligned holes, the printed lines being short dashes between the holes, a metal contact bushing secured in some holes for connection to pins and also serving to connect the printed circuit lines on each side of the bushing, metal washers around some holes which connect the printed circuit lines on each side of the hole, the remaining holes having no means to connect the printed circuit lines thereat, and metal pins in some of said aligned holes for connection to those boards where there are metal bushings, one of said boards having vertical lines, a second having horizontal dashes, a third having diagonal dashes, and a fourth having diagonal dashes of opposite slope.

3. Multilayer circuitry comprising a plurality of superposed matrix boards, each board having printed wiring, means holding said boards in superposed relation, said boards having aligned holes, the printed lines being short dashes between the holes, a metal contact bushing secured in some holes, said bushing having tongues projecting inwardly and also serving to connect the printed circuit lines thereat, some holes having tongueless bushings holding metal washers which connect the printed circuit lines thereat, the remaining holes having no means to connect the printed circuit lines thereat, and metal pins in some of said aligned holes for connection to those boards where there are metal bushings.

4. Multilayer circuitry comprising a plurality of superposed matrix boards, each board having printed wiring, means holding said boards in superposed relation, said boards having aligned holes, the printed lines being short dashes between the holes, a metal contact bushing secured in some holes, said bushing having tongues projecting inwardly and also serving to connect the printed circuit lines thereat, some holes having tongueless bushings holding metal washers which connect the printed circuit lines thereat, the remaining holes having no means to connect the printed circuit lines thereat, and metal pins in some of said aligned holes for connection to those boards where there are metal bushings, one of said boards having vertical dashes, a second having horizontal dashes, a third having diagonal dashes, and a fourth having diagonal dashes of opposite slope.

5. Multilayer circuitry comprising a plurality of superposed matrix boards, each board having printed wiring, means holding said boards in superposed relation, said boards having aligned holes, the printed lines being short dashes between holes, a metal contact bushing secured in some holes, said bushing having tongues projecting inwardly and also serving to connect the printed circuit lines on each side of the bushing, some holes having insulation bushings holding metal washers which connect the printed circuit lines on each side of the bushing, the remaining holes being left empty, and metal pins in some of said aligned holes for connection to those boards where there are metal bushings.

6. Multilayer circuitry comprising a plurality of superposed matrix boards, each board having printed wiring, means holding said boards in superposed relation, said boards having aligned holes, the printed lines being short dashes between holes, a metal contact bushing secured in some holes, said bushing having tongues projecting inwardly and also serving to connect the printed circuit lines on each side of the bushing, some holes having insulation bushings holding metal washers which connect the printed circuit lines on each side of the bushing, the remaining holes being left empty, and metal pins in some of said aligned holes for connection to those boards where there are metal bushings, one of said boards having dashes, a second having horizontal dashes, a third having diagonal dashes, and a fourth having diagonal dashes of opposite slope.

7. Multilayer circuitry comprising a plurality of superposed shielded matrix boards, each board having printed wiring, means holding said boards in superposed relation, said boards having aligned holes, the printed lines being short dashes between holes, a metal contact bushing secured in some holes, said bushing having tongues projecting inwardly and also serving to connect the printed circuit lines on each side of the bushing, some holes having tongueless bushings holding metal washers which connect the printed circuit lines on each side of the bushing, the remaining holes being left empty, and metal pins in some of said aligned holes for connection to those boards where there are metal bushings, said boards additionally having grounded shield lines running between the aforesaid lines of dashes and forming a grid.

8. Multilayer circuitry comprising a plurality of superposed shielded matrix boards, each board having printed wiring, means holding said boards in superposed relation, said boards having aligned holes, the printed lines being short dashes between holes, a metal contact bushing secured in some holes, said bushing having tongues projecting inwardly and also serving to connect the printed circuit lines on each side of the bushing, some holes having tongueless bushings holding metal washers which connect the printed circuit lines on each side of the bushing, the remaining holes being left empty, and metal pins in some of said aligned holes for connection to those boards where there are metal bushings, one of said boards having vertical dashes, a second having horizontal dashes, a third having diagonal dashes, and a fourth having diagonal dashes of opposite slope, said boards additionally having grounded shield lines running between the aforesaid lines of dashes and forming a grid.

9. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring, means holding said boards in superposed relation, said boards having holes in alignment with the terminals of the connectors, the printed lines being short dashes between the holes, a metal contact bushing secured in some holes for connection to pins and also serving to connect the printed circuit lines on each side of the bushing, metal washers around some holes to connect the printed circuit lines on each side of the hole, the remaining holes having no means to connect the printed lines thereat, and metal pins in some of said aligned holes for connection between the boards, some of said pins being received in said terminals for connection thereto.

10. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring, means holding said boards in superposed relation, said boards having holes in alignment with the terminals of the connectors, the printed lines being short dashes between holes, a metal contact bushing secured in some holes for connection to pins and also serving to connect the printed circuit lines on each side of the bushing, metal washers around some holes to connect the printed circuit lines on each side of the hole, the remaining holes having no means to connect the printed lines thereat, and metal pins in some of said aligned holes for connection between the boards, some of said pins being received in said terminals for connection thereto, one of said boards having vertical dashes, a second having horizontal dashes, a third having diagonal dashes, and the fourth having diagonal dashes of opposite slope.

11. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring, means holding said boards in superposed relation, said boards having holes in alignment with the terminals of the connectors, additional holes between said holes, the printed lines being short dashes between the holes, a metal contact bushing secured in some holes, said bushing having spring tongues projecting inwardly and also serving to connect the printed circuit lines thereat, some holes having tongueless bushings holding metal washers to connect the printed circuit lines thereat, the remaining holes having no means to connect the printed lines thereat, and metal pins in some of said aligned holes for connection between the boards, some of said pins being received in said terminals for connection thereto.

12. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring means holding said boards in superposed relation, said boards having holes in alignment with the terminals of the connectors, additional holes between said holes, the printed lines being short dashes between the holes, a metal contact bushing secured in some holes, said bushing having spring tongues projecting inwardly and also serving to connect the printed circuit lines thereat, some holes having tongueless bushings holding metal washers to connect the printed circuit lines thereat, the remaining holes having no means to connect the printed lines thereat, and metal pins in some of said aligned holes for connection between the boards, some of said pins being received in said terminals for connection thereto, one of said boards having vertical dashes, a second having horizontal dashes, a third having diagonal dashes, and the fourth having diagonal dashes of opposite slope.

13. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring, means holding said boards in superposed relation, said boards having holes in alignment with the terminals of the connectors, the printed lines being short dashes between the holes, a metal contact bushing secured in some holes, said bushing having spring tongues projecting inwardly and also serving to connect the printed circuit lines on each side of the bushing, some holes having insulation bushings holding metal washers to connect the printed circuit lines on each side of the insulation bushing, the remaining holes being left empty, and metal pins in some of said aligned holes for connection between the boards having metal bushings, some of said pins being received in said terminals for connection thereto.

14. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards each matrix board having printed wiring, means holding said boards in superposed relation, said boards having holes in alignment with the terminals of the connectors, the printed lines being short dashes between the holes, a metal contact bushing secured in some holes, said bushing having spring tongues projecting inwardly and also serving to connect the printed circuit lines on each side of the bushing, some holes having insulation bushings holding metal washers to connect the printed circuit lines on each side of the insulation bushing, the remaining holes being left empty, and metal pins in some of said aligned holes for connection between the boards having metal bushings, some of said pins being received in said terminals for connection thereto, one of said boards having vertical dashes, a second having horizontal dashes, a third having diagonal dashes, and the fourth having diagonal dashes of opposite slope.

15. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring, means holding said boards in superposed relation, said boards having holes in alignment with the terminals of the connectors, the printed lines being short dashes between the holes, a metal contact bushing secured in some holes, said bushing having spring tongues projecting inwardly and also serving to connect the printed circuit lines on each side of the bushing, some holes having tongueless bushings and serving to connect the printed circuit lines on each side of the tongueless bushing, the remaining holes being left empty, and metal pins in some of said aligned holes for connection between the boards having tongued bushings, some of said pins being received in said terminals for connection thereto, said boards additionally having grounded lines running between the aforesaid lines of dashes and forming a grid.

16. A rack having guides for the reception of printed circuit mother boards, and having edge board connectors at the rear for detachable connection to the printed lines on the mother boards, and multilayer matrix boards for interconnecting the terminals of the edge board connectors, said matrix boards being coextensive in area with the array of edge board connectors and being disposed in perpendicular relation to the mother boards, each matrix board having printed wiring, means holding said boards in superposed relation, said boards having holes in alignment with the terminals of the connectors, the printed lines being short dashes between the holes, a metal contact bushing secured in some holes, said bushing having spring tongues projecting inwardly and also serving to connect the printed circuit lines on each side of the bushing, some holes having tongueless bushings and serving to connect the printed circuit lines on each side of the tongueless bushing, the remaining holes being left empty, and metal pins in some of said aligned holes for connection between the boards having tongued bushings, some of said pins being received in said terminals for connection thereto, one of said boards having vertical dashes, a second having horizontal dashes, a third having diagonal dashes, and the fourth having diagonal dashes of opposite slope, said boards additionally having grounded lines running between the aforesaid lines of dashes and forming a grid.

17. Multilayer circuitry comprising a plurality of superposed matrix boards, each board having printed wiring, means holding said boards in superposed relation, said boards having aligned holes, the printed lines being short dashes between the holes, a metal contact bushing secured in some holes for connection to pins and also serving to connect the printed circuit lines on each side of the bushing, the remaining holes having no means to connect the printed circuit lines thereat, and metal pins in some of said aligned holes for connection to those boards where there are metal bushings.

18. Multilayer circuitry as defined in claim 17, in which the holes are threaded, and the metal bushings are externally threaded and are screwed into the holes in the boards and have nuts acting as lock nuts.

19. Multilayer circuitry as defined in claim 1, in which the holes are threaded, and the metal bushings are externally threaded and are screwed into the holes in the boards and have nuts acting as lock nuts.

20. Multilayer circuitry as defined in claim 3, in which the holes are threaded, and the metal bushings are externally threaded and are screwed into the holes in the boards and have nuts acting as lock nuts.

21. Multilayer circuitry as defined in claim 5, in which the holes are threaded, and the metal bushings are externally threaded and are screwed into the holes in the boards and have nuts acting as lock nuts.

22. Multilayer circuitry as defined in claim 17, in which the bushings have a flange at one end and an annular bead near the other end, and are circumferentially yieldable, and are received in the holes with a snap fit.

23. Multilayer circuitry as defined in claim 1, in which the bushings have a flange at one end and an annular bead near the other end, and are circumferentially yieldable, and are received in the holes with a snap fit.

24. Multilayer circuitry as defined in claim 3, in which the bushings have a flange at one end and an annular bead near the other end, and are circumferentially yieldable, and are received in the holes with a snap fit.

25. Multilayer circuitry as defined in claim 5, in which the bushings have a flange at one end and an annular bead near the other end, and are circumferentially yieldable, and are received in the holes with a snap fit.

References Cited by the Examiner

UNITED STATES PATENTS

| | | | |
|---|---|---|---|
| 1,146,881 | 7/15 | Jeffries | 339—217 X |
| 1,505,049 | 8/24 | Mason | 339—217 X |
| 1,677,068 | 7/28 | Alden | 339—217 X |
| 2,290,172 | 7/42 | Eby | 339—258 X |
| 2,673,898 | 3/54 | Reichert | 339—217 X |
| 2,704,357 | 3/55 | Johnson | 339—217 |
| 2,756,485 | 7/56 | Abramson et al. | |
| 2,892,129 | 6/59 | Henry | 339—17 X |
| 2,903,670 | 9/59 | Sitz | 339—217 X |
| 2,950,458 | 8/60 | Artz | 399—217 |
| 2,967,285 | 1/61 | Freitas | 339—18 |
| 3,079,581 | 2/63 | Klumpp | 339—217 X |
| 3,105,729 | 10/63 | Rosenthal et al. | 339—18 |
| 3,148,356 | 9/64 | Hedden. | |

FOREIGN PATENTS 70,102  10/58  France.

JOSEPH D. SEERS, *Primary Examiner.*

PATRICK A. CLIFFORD, *Examiner.*